United States Patent Office 3,783,095
Patented Jan. 1, 1974

3,783,095
PROCESS FOR RECOVERING TURPENTINE AND HEAT IN CONNECTION WITH THE EVAPORATION OF BLACK LYE
Daniel Jafs, Helsinki, and Tapani Marttala, Varkaus, Finland, Kai Christiansen, Karlstad, Sweden, and Bertel Hakulin, Lahderanta, Finland, assignors to A. Osakeyhtio Ahlstrom, Noormarkku, Finland
Filed Feb. 18, 1972, Ser. No. 227,435
Claims priority, application Finland, Feb. 19, 1971, 474/71
Int. Cl. D21c 11/10
U.S. Cl. 162—16          6 Claims

ABSTRACT OF THE DISCLOSURE

Turpentine and heat is recovered in connection with the evaporation of black lye emerging from a continuously working cellulose digester under high pressure and at high temperature. In a first step the black lye is concentrated in two successive expansion tanks and is thereupon fed into a multiphase evaporation apparatus operated by indirect heat exchange and fed with additional heat. The lye vapors from the first expansion tank are conducted to the first evaporation phase and the lye vapors from the second expansion tank to an evaporation phase succeeding the second evaporation phase, whereupon the condensate is collected at least from those evaporation phases to which the lye vapors from the expansion tanks have been fed and finally turpentine is recovered from these condensates in known manner. The lye condensates coming from the first and third evaporation phases may advantageously be combined before recovering turpentine therefrom.

BACKGROUND OF THE INVENTION

Field of the invention

This invention relates to a process for recovering turpentine and heat in connection with the evaporation of black lye emerging from a continuous working cellulose digester under high pressure and at high temperature; black lye is first concentrated in two successive expansion tanks from which the black lye is conducted into a multiphase evaporation systems into which additional heat is brought.

DESCRIPTION OF THE PRIOR ART

Previously known is an evaporation process for black lye emerging from a continuous working cellulose digester under high pressure and at high temperature, a process in which the black lye is first pre-evaporated by lowering the pressure and by conducting the formed lye vapors into several successive expansion phases. From the last expansion phase the pre-evaporated lye is conducted for further evaporation into an indirect multiphase evaporator; the first heating phase is heated with lye vapor emerging from the previous heating phase. Lye vapor emerging from each expansion phase, except for the first one, is used as additional heating vapor for the said heating phases, in which case vapor from the second expansion phase is fed to the second heating phase, etc. Because the lye vapor emerging from the first expansion phase contains turpentine it has been suggested that this lye vapor be fed into a turpentine condenser.

Previously known is also a process for recovering heat from black lye emerging from a cellulose digester. In this process, black lye is fed under increased pressure and at increased temperature from the digester into the first expansion tank, where its pressure is lowered with the result that part of the lye is vaporized, and the lye emerging from the first expansion tank is fed, together with possible additional vapor, into the first evaporator working under a lower pressure, where part of the lye is vaporized. The vapor formed in the first expansion tank is used for the indirect heating of the lye in the first evaporator, from where the unvaporized black lye is fed into the second expansion tank and then into the second evaporator, which works under a lower pressure than the second expansion tank and which is heated indirectly with vapor emerging from the second expansion tank. The unvaporized lye is removed and the vapor formed in the second evaporator is condensed, in which case the condensate originating in the second evaporator can be treated for the recovery of turpentine.

Also previously known is an evaporation apparatus in which lye emerging from the digester is fed into the first expansion tank, from where the vapor is conducted into the pre-evaporation tank and the lye is conducted into the second expansion tank, which also works as a storage tank. From the second expansion tank lye is pumped into the first evaporation unit and from there co-currently through several evaporation units to the storage. The vapor from the second expansion tank is conducted to the vapor side of the first evaporation unit and a small amount of live steam is added to this expansion vapor to regulate the flow. The vapor formed on the liquid side of the first unit is conducted to the vapor side of the next unit, etc. Each unit is connected with a mutual discharge pipe system for vapor; the discharge pipe system is connected with the turpentine recovery apparatus.

In these previously known systems, at least part of the expansion vapors or lye vapors emerging from the evaporators, which contain considerable amounts of turpentine, are fed back into the boiler, thus creating a continuous circulation of turpentine between the digester and the evaporation apparatus. In practice, however, this circulation contains several leakage points from which turpentine escapes from the system causing losses of turpentine.

It must also be noted that if steam is added directly to the lye as mentioned above, to heat it, the condensate of this steam can no longer be used elsewhere as, for example, feed water of a boiler.

SUMMARY OF THE INVENTION

In accordance with this invention there is provided a process of the character once described, which comprises concentrating the black lye in two successive expansion tanks; feeding the black lye from said expansion tanks into a multiphase evaporation apparatus, which is operated by indirect heat exchange and to which additional heat is brought; conducting the lye vapors coming from the first expansion tank to the first evaporation phase and the lye vapors from the second expansion tank to an evaporation phase after the second evaporation phase; collecting condensate at least from those evaporation phases to which the lye vapors from the expansion tanks have been fed; and finally recovering turpentine from these condensates in known manner.

The lye vapors from the second expansion tank and from the second evaporation phase may be fed together to the third evaporation phase and the condensates from the first and third evaporation phases may advantageously be combined before recovering of turpentine therefrom.

DESCRIPTION OF THE PREFERRED EMBODIMENTS

Figure 1:
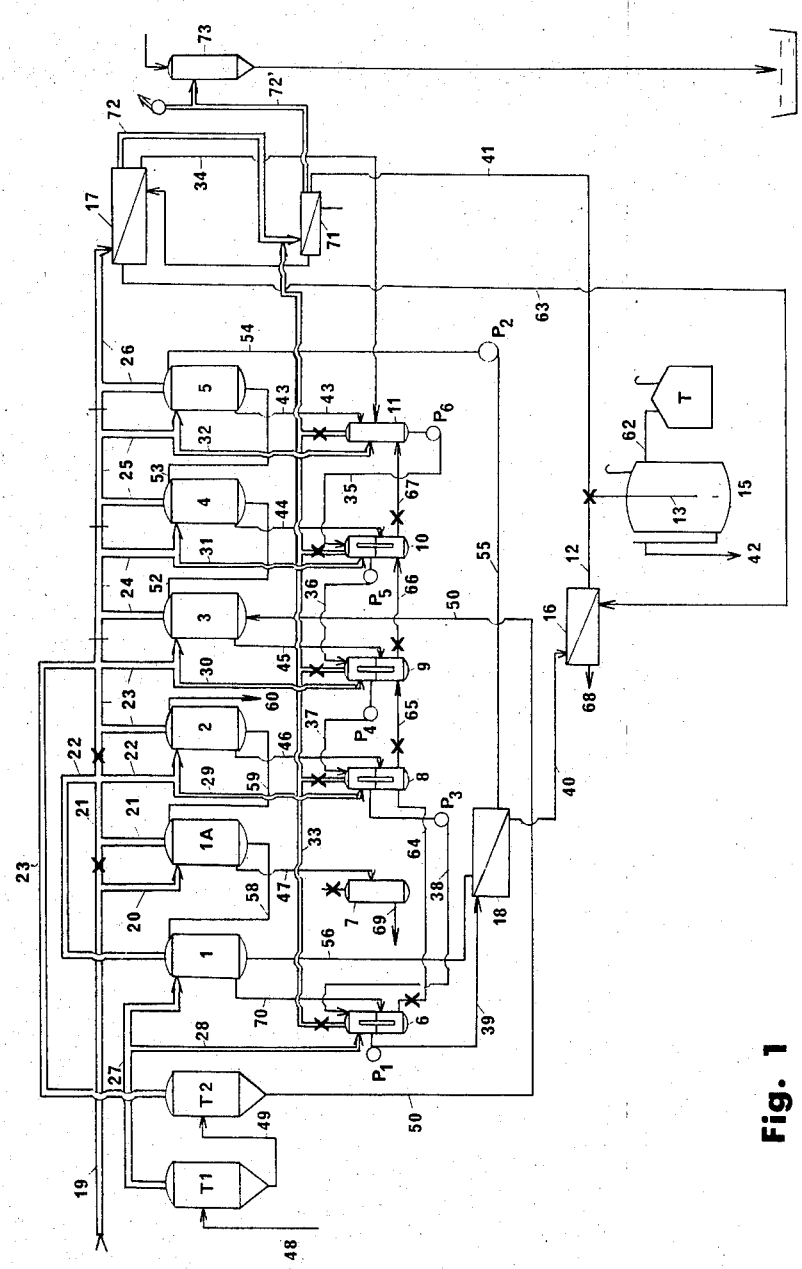
FIG. 1 shows a schematical diagram of a plant for carrying out the process according to the invention.

The lye emerging from the cellulose digester is fed through pipe 48 into first expansion tank T1 and there-after into second expansion tank T2 along pipe 49. From second expansion tank T2, the lye flows through pipe 50 into evaporation unit 3. From evaporation unit 3, the lye is conducted co-currently with vapor into evaporation units 4 and 5 through pipes 52 and 53. From evaporation unit 5 the lye is conducted into heat exchanger 18 through pipes 54 and 55 and pump P2, and from heat exchanger 18 the lye is conducted into evaporation unit 1 through pipe 56 and therefrom to evaporation unit 1A through pipe 58, and then into evaporation unit 2 through pipe 59. Finally, the concentrated lye is removed from second evaporation phase 2 through pipe 60.

Evaporation unit 1A is heated with fresh steam, which is conducted to the vapor side of unit 1A through pipes 19 and 20, and the fresh condensate is discharged into pipe 47, which leads to fresh condensate tank 7, from where fresh condensate water is removed through pipe 69.

From expansion tank T1, the lye vapors are removed through pipe 27 to the primary side of first evaporation unit 1, from where the hot condensate is removed through pipe 70, which is connected with the lower part of double-part condensate tank 6, whereafter the same condensate is conducted through pipe 64 into the next condesate tank 8 operating at a lower temperature, where it expands.

The lye vapors emerging from the primary side of first evaporation phase 1 are conducted through pipe 22 to second evaporation phase 2 together with the vapors flowing in pipe 21 from evaporation phase 1A coupled parallelly on the secondary side. The vapors coming from phases 1 and 1A are condensed in phase 2 and the hot condensates are removed through pipe 46 into the lower part of condensate tank 8, where they are mixed with the hotter condensate coming from the lower part of condensate tank 6. The combined hot condensates are conducted, after the expansion, through pipe 65 into the lower part of the next condensate tank 9.

The lye vapors of evaporation phase 2 are conducted through pipe 23 to third evaporation phase 3, together with the lye vapors flowing in pipe 23' from second expansion tank T2. The condensate formed in phase 3 is conducted along pipe 45 into the lower part of condensate tank 9, where it is combined with the hot condensate coming from the lower part of the previouse condensate tank 8. The expanded condensate is then fed through pipe 66 into the lower part of condensate tank 10.

The upper and lower parts of the double-part condensate tanks are separated by partitions, which prevent the mixing of the condensates. The hot condensate in the lower part of a tank is allowed to expand and the formed lye vapors are conducted through the pipe connecting the upper and lower parts of the tank into the upper part of the tank, at which time the expanded lye vapors are mixed with the condensate in the upper part of the tank to heat it.

The vapor emerging from phase 3 is conducted through pipe 24 to phase 4, and from there the warm condensates are fed through pipe 44 into the lower part of condensate tank 10, where they are combined with the hot condensates coming from the lower part of condensate tank 9 and are allowed to expand as described above.

Finally, the vapor coming from phase 4 is conducted to last phase 5 through vapor pipe 25, and the formed condensate is fed into one-part condensate tank 11, where vapor is mixed with the warm condensate coming from the lower part of condensate tank 10. In addition, there is a connecting pipe 32 between vapor pipe 25 and condensate tank 11.

The vapor vaporized in evaporation phase 5 is fed through pipe 26 into surface condenser 17, where it is indirectly cooled with water. The condensate is removed through pipe 34 into condensate tank 11, from where all the condensates are removed as a mixture with pump $P_6$ through pipe 35 into the upper part of condensate tank 10, where the mixture is heated directly both with expansion vapors emerging from the lower part and with bleeder vapor conducted from pipe 24 through pipe 31, and the heated flow is pumped with pump $P_5$ through pipe 36 into the upper part of condensate tank 9, where it is heated with expansion vapors and with bleeder vapors taken from pipe 23 through pipe 30. From the upper part of condensate tank 9, the hot condensate is fed with pump $P_4$ through pipe 37 into the upper part of condensate tank 8, where it is heated with expansion vapors and with bleeder vapors taken from pipe 22 through pipe 29. Finally, the warm condensates are pumped into the upper part of first condensate tank 6 with pump $P_3$ through pipe 38, and the lye vapors coming from first expansion tank T1 and flowing in pipe 28 are mixed with them. From condensate tank 6, the heated condensates are pumped with pump $P_1$ through pipe 39 into heat exchanger 18 for the indirect heating of the lye to be fed to phase 1, and from there further along pipe 40 into heat exchanger 16 for the heating of the cooling water at a temperature in the order of 45° C. coming from surface condenser 17 and flowing in pipe 63 to be used elsewhere, and finally the condensate, which is at a temperature of the order of 50° C. is conducted to decanting apparatus 15 through pipes 12 and 13.

In each of the tanks 6–11, there is a gas discharge device for the removal of gases following the condensate. From tanks 6, 8, 9, 10, and 11, the gases are discharged into mutual conduit 33 and combined with the gases from surface condenser 17 flowing in pipe 72, and fed together into gas cooler 71, where they are indirectly cooled with water; the water is then conducted into surface condenser 17. From gas cooler 71, the condensate is conducted through pipes 41 and 13 into decanting apparatus 15, and the uncondensed gases are conducted through pipe 72' into raining apparatus 73.

The separated water is removed from the bottom of decanting apparatus 15 into discharge pipe 42, and the turpentine is recovered from the upper part of the apparatus and conducted through pipe 62 into turpentine storage tank T.

In the apparatus shown in FIG. 1, all the condensate is collected into decanting apparatus 15. An almost complete recovery of turpentine is thus obtained.

Figure 2:
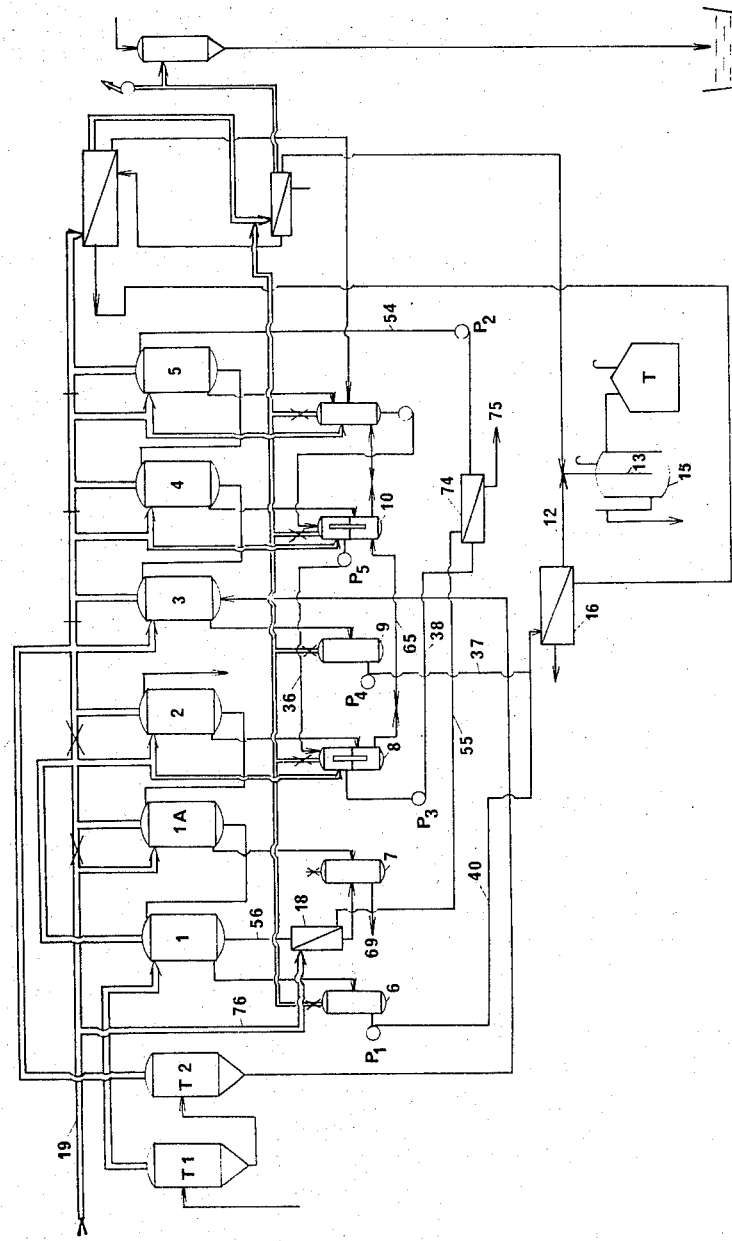
FIG. 2 shows also schematically another embodiment of such a plant.

In the modification shown in FIG. 2, only the condensates coming from evaporation phases 1 and 3 are fed into the system for the recovery of turpentine. It has been noticed that these condensates contain the bulk of the total amount of turpentine. An advantage is thereby gained in that the amount of condensate to be treated is decreased to about one-fourth, and smaller and less expensive devices can be used. The operation costs are also lowered.

The apparatus according to FIG. 2 deviates from the apparatus according to FIG. 1 in the following manner: Double-part condensate tanks 6 and 9 have been replaced by conventional one-part condensate tanks. From the upper part of condensate tank 10, the warm condensate is pumped with pump $P_5$ through pipe 36 past tank 9 directly into the upper part of second condensate tank 8. The vapor-heated warm condensate is then pumped with pump $P_3$ through pipe 38 into heat exchanger 74, where bleeder lye flowing from phase 5 to phase 1 is pre-heated indirectly.

The expanded condensate emerging from the lower part of condensate tank 8 is conducted through pipe 65 past tank 9 directly into the lower part of condensate tank 10.

From tank 9, the condensate is pumped with pump $P_4$ along pipe 37 at, for example, about 104° C. and combined with the condensate flowing in pipe 40 at, for example, about 120° C. After heat exchanger 16, its temperature is about 50° C. and it is finally conducted into decanting apparatus 15 through pipes 12 and 13.

From tank 6, the condensate of phase 1 is pumped with pump $P_1$ through pipe 40 into heat exchanger 16.

The pre-heated lye coming from heat exchanger 74 is further pre-heated indirectly with live steam in heat exchanger 18 before the lye is conducted to phase 1 through pipe 56. The live steam is taken from pipe 19 through pipe 76, and the condensate is fed into fresh condensate tank 7.

It must be understood that the invention is not limited to the condenser system shown as an example in the enclosed drawings and that additional heat can also be brought to the multiphase evaporation apparatus by means other than live steam. Bleeder lye can thus be heated, for example, with the help of a thermocompressor before the lye coming from phase 5 is fed to phase 1. If live steam is not used, evaporation phase 1A and fresh condensate tank 7 are eliminated as are pipes 19–21, 47, 59, and 69, and pipe 58 is connected directly with phase 2.

What is claimed is:

1. A process for the recovery of turpentine and heat from black lye emerging at high pressure and at high temperature from a continuous working cellulose digester, which comprises the steps of introducing the black lye into a first zone of reduced pressure to concentrate the lye by the expansion of vapor therefrom, introducing the lye concentrate from said first zone of reduced pressure into a second zone of reduced pressure to further concentrate said lye by the expansion of vapor therefrom, introducing the lye concentrate from said second zone of reduced pressure into one stage of a multi-stage evaporator having at least three evaporator stages for evaporation thereby, conducting the lye vapors from said first zone of reduced pressure to the first stage of said evaporator for recovery of heat by heat exchange therein, conducting the lye vapors from said second zone of reduced pressure into a stage of said evaporator subsequent to the second stage thereof for further recovery of heat by heat exchange therein, condensing the lye vapors of said evaporator stages into which vapors from said first and second reduced pressure zones have been introduced to form condensates, collecting said condensates and separating the turpentine content from said collected condensates.

2. A process according to claim 1 wherein the lye vapors from said second zone of reduced pressure are introduced into the third stage of said evaporator together with lye vapors from the second stage of the evaporator.

3. A process according to claim 1 wherein the lye vapors from all stages of said evaporator are condensed and the condensates are collected and the turpentine content of said collected condensates is separated therefrom.

4. A process according to claim 1 including the step of introducing pre-concentrated lye into the third stage of said evaporator for evaporation therein and in subsequent stages of the evaporator, and introducing lye from the last stage of the evaporator into the first stage thereof and removing concenrated lye from the second stage of the evaporator.

5. A process according to claim 4 including the step of heating the lye from the last stage of the evaporator prior to introduction into the first stage of the evaporator.

6. A process according to claim 4 including the steps of heating with fresh steam an auxiliary evaporator stage flow connected in parallel with the first stage of the evaporator, on the secondary vapor side and flow connected therewith in series on the primary side, and introducing the lye vapors from said auxiliary evaporation stage into said second stage of the evaporator.

References Cited
UNITED STATES PATENTS

| 3,492,198 | 1/1970 | Rosenblad | 162—15 |
|---|---|---|---|
| 3,607,617 | 9/1971 | Drew | 162—239 X |
| 3,179,159 | 4/1965 | Jafs | 159—47 WL |

FOREIGN PATENTS

| 673,649 | 10/1929 | France | 162—15 |
|---|---|---|---|

ROBERT L. LINDSAY, JR., Primary Examiner

R. V. FISHER, Assistant Examiner

U.S. Cl. X.R.

159—47 WL; 162—239, 240